(12) United States Patent
Ball

(10) Patent No.: US 6,189,047 B1
(45) Date of Patent: *Feb. 13, 2001

(54) APPARATUS AND METHOD FOR MONITORING EVENT QUEUE OPERATIONS WITH PLUGGABLE EVENT QUEUES

(75) Inventor: Thomas A. Ball, San Jose, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/821,686

(22) Filed: Mar. 20, 1997

(51) Int. Cl.[7] .............................. G06F 13/10; G06F 9/46
(52) U.S. Cl. ............................................................ 709/318
(58) Field of Search ........................... 345/334; 395/670; 709/301, 302, 318

(56) References Cited

U.S. PATENT DOCUMENTS

| | | | |
|---|---|---|---|
| 4,896,290 | * 1/1990 | Rhodes et al. | 364/900 |
| 5,371,891 | 12/1994 | Gray et al. | 395/700 |
| 5,590,360 | * 12/1996 | Edwards | 395/800 |
| 5,600,780 | * 2/1997 | Hiraga et al. | 395/0 |
| 5,682,328 | * 10/1997 | Roeber et al. | 364/550 |
| 5,696,702 | * 12/1997 | Skinner et al. | 364/551.01 |
| 5,748,499 | * 5/1998 | Trueblood | 364/551.01 |
| 5,768,510 | * 6/1998 | Gish | 395/200.33 |
| 5,838,972 | * 11/1998 | Matsuzuka et al. | 395/685 |
| 5,857,190 | * 1/1999 | Brown | 707/10 |
| 5,996,054 | * 12/1999 | Ledain et al. | 711/203 |

OTHER PUBLICATIONS

Ritchey, Tim; "Java!"; New Riders Publishing; pp. 214–216 and 272–280, Jan. 1996.*

* cited by examiner

Primary Examiner—Zarni Maung
Assistant Examiner—Gary Scott Fourson
(74) Attorney, Agent, or Firm—William S. Galliani; Pennie & Edmonds LLP

(57) ABSTRACT

A method of monitoring event queue operations includes the step of responding to a set of run-time messages resulting from an operation performed with a graphical user interface. The set of messages is routed to a customized event queue module for processing. The customized event queue module reports operations associated with the set of messages. This information can be used for debugging, tracing, and event recording. The customized event queue module operates without altering the operation of the event queue. Thus, the invention can be used without altering proprietary software defining the operation of the event queue.

3 Claims, 3 Drawing Sheets

APPARATUS AND METHOD FOR MONITORING EVENT QUEUE OPERATIONS WITH PLUGGABLE EVENT QUEUES

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BRIEF DESCRIPTION OF THE INVENTION

This invention relates generally to event queues used between graphical user interfaces and application programs. More particularly, this invention relates to pluggable event queues that software developers can use for monitoring the operations of event queues, while not affecting the operation of the event queues or otherwise modifying source code associated with the event queues.

BACKGROUND OF THE INVENTION

FIG. 1 illustrates a software event queue environment 20 in accordance with the prior art. The environment 20 includes a graphical user interface (GUI) 22 which supports a first application window 24A and a second application window 24B. By way of example, the first application window 24A may be for a word processor application program, while the second application window 24B may be for a spread sheet application program.

When a user performs an operation on an application window 24, such as clicking on an object or resizing a window, messages are generated that describe the operation that was performed. The messages are sent to an event queue 28, as constructed with event queue code 27. FIG. 1 illustrates that the first application window 24A sends a first set of messages to a first event queue 28A, while the second application window 24N sends a second set of messages to a second event queue 28N. Each event queue operates as a buffer between its corresponding application window 24 and application program 30. Thus, the event queue 28A operates as a buffer between the application window 24A and the application program 30A, while the event queue 28N operates as a buffer between the application window 24N and the application program 30N.

FIG. 2 illustrates a computer 40 used to implement the system of FIG. 1. The computer 40 includes a central processing unit (CPU) 42 that communicates with a set of input/output devices 44 over a system bus 46. The input/output devices 44 include a keyboard, mouse, computer monitor, printer, etc. The computer monitor is used to display the GUI 22. The system bus 46 is also connected to a memory 48. The memory 48 stores a number of programs and data associated with the system of FIG. 1. In particular, the memory 48 stores operating system code 50 and GUI code 32, which is used to generate the GUI 22. Associated with the GUI code 32 is event queue code 27, which is used to generate the event queues 28A–28N. Finally, the memory 48 stores a number of application programs 30A–30N.

The set of event queues 28A–28N constitutes a fixed and proprietary event queue implementation 26. The developer of the GUI 22 defines the event queue code 34 that is used to form the event queue implementation 26. This code is typically fixed and proprietary, meaning that its implementation is not modifiable so as to allow programmers to add code to extend the functionality of the event queue implementation 26 at runtime. Since it is impossible to change the operation of prior art event queue implementations, developers cannot create specialized event queues for debugging, tracing, and event recording operations.

In view of the foregoing, it would be highly desirable to provide a technique for extending the functionality of event queues. In particular, it would be highly desirable to allow developers to extend and customize event queue implementations without modification of GUI source code.

SUMMARY OF THE INVENTION

A method of monitoring event queue operations includes the step of responding to a set of run-time messages resulting from an operation performed with a graphical user interface. The set of messages is routed to a customized event queue module for processing. The information generated by the customized event queue module can be used for debugging, tracing, and event recording. The customized event queue module operates without altering the operation of the event queue. Thus, embodiments of the invention can be used without altering proprietary software defining the operation of the event queue. Accordingly, embodiments of the invention can be operated as pluggable add-ons to existing event queue environments. Advantageously, embodiments of the invention can be easily loaded by creating a text message in a properties file.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
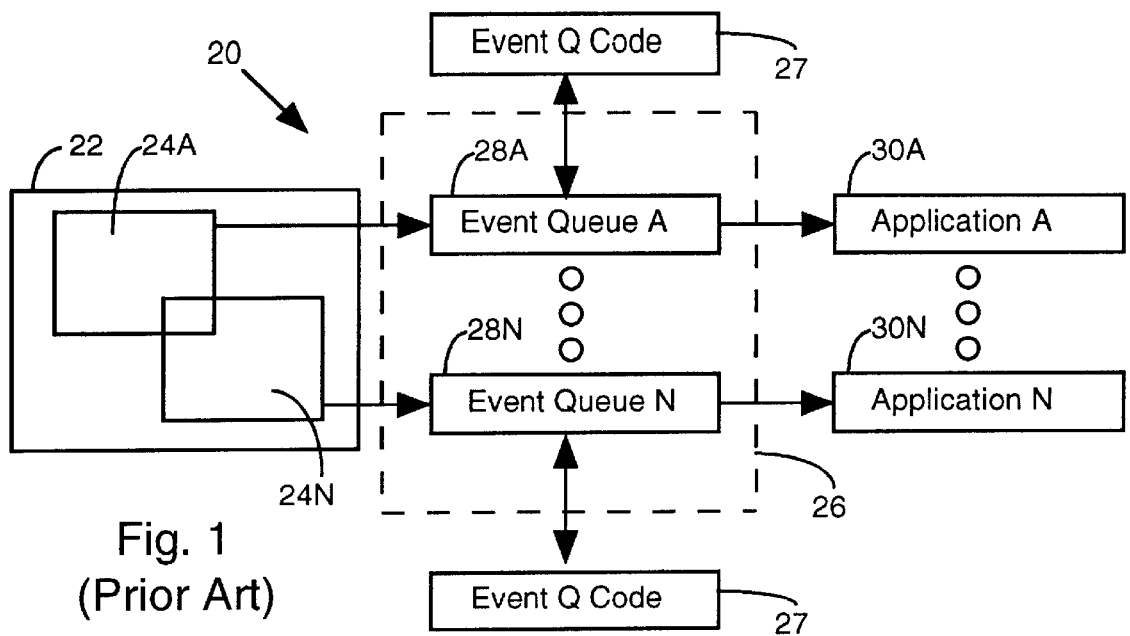
FIG. 1 illustrates a software event queue environment in accordance with the prior art.
Figure 2:
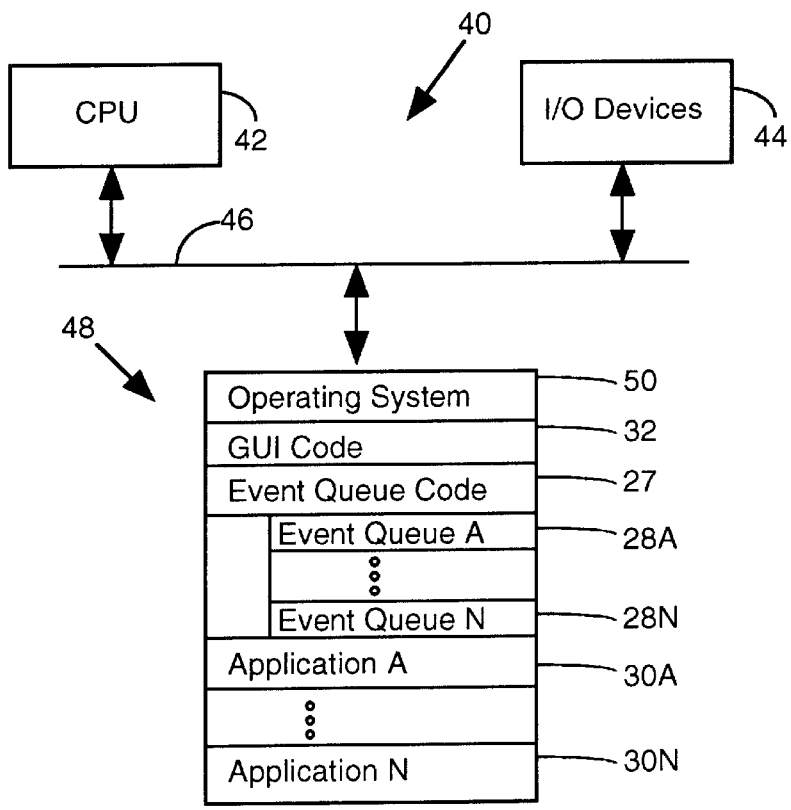
FIG. 2 illustrates a computer apparatus used to implement the software event queue environment of FIG. 1.
Figure 3:
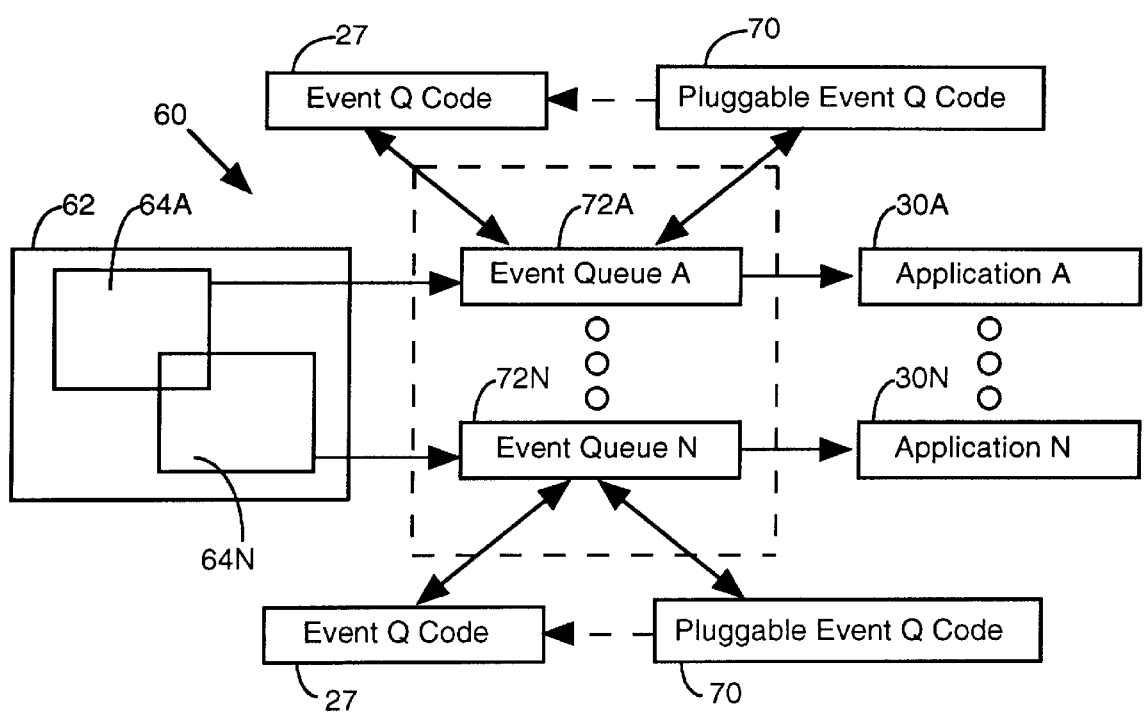
FIG. 3 illustrates a software event queue environment with pluggable event queues in accordance with an embodiment of the invention.

FIG. 3 illustrates a modular software event queue environment 60 in accordance with an embodiment of the invention. The environment 60 includes a GUI 62 supporting a first application window 64A and a second application window 64N. As in the prior art, an operation performed with the GUI 62 (e.g., pressing a button or resizing a window) results in a set of run-time messages characterizing the operation performed. The set of messages is passed to an event queue 72, which operates as a buffer for its respective application program 30. In particular, the event queue 72A operates as a buffer between application window 64A and application program 30A, while event queue 72N operates as a buffer between application window 64N and application program 30N.

In accordance with the invention, customized or pluggable event queue code 70 is used to create the event queues 72A–72N or to supplement the operation of event queues operated in accordance with standard event queue code 27.

As described below, the customized event queue code 70 is automatically executed at run time. When invoked, it may replace the standard event queue code 27. In this case, the pluggable event queue code 70 defines the operation of the event queues 72A–72N. As will be described below, the pluggable event queue code 70 may call the standard event queue code 27, allowing the standard event queue code 27 to operate in a standard prior art manner. In such a case, the event queues 72A–72N are controlled by the event queue code 27.

FIG. 3 illustrates the pluggable event queue code 70 controlling the event queues 72A–72N. The figure also shows that the pluggable event queue code 70 may call the event queue code 27, in which case the event queue code 27 controls the event queue elements 72A–72N.

The customized event queue code 70 results in specialized event queues that may be used for reporting purposes, such as debugging, tracing, and event recording. As will be described below, the customized event queue code 70 is invoked and operated without affecting the operation of event queue code 27. Accordingly, the invention can be readily used as a pluggable addition to a proprietary or fixed event queue environment defined by event queue code 27.

Figure 4:
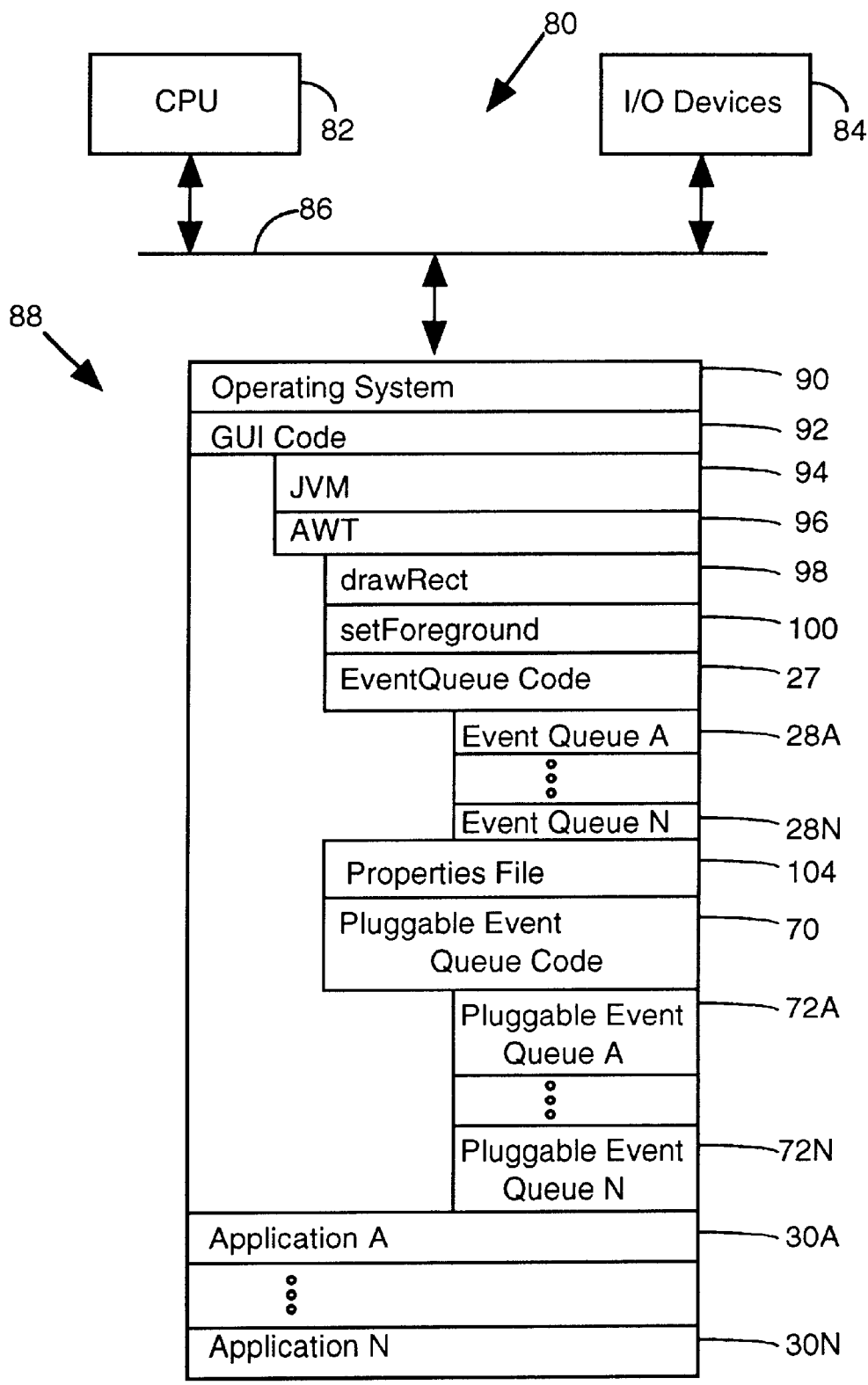
FIG. 4 illustrates a computer apparatus used to implement the software event queue environment of FIG. 3.

The operation of the invention is more fully appreciated with reference to FIG. 4 and the sample computer code provided below. FIG. 4 illustrates a computer 80 constructed in accordance with an embodiment of the invention. The computer 80 includes a CPU 82 which communicates with a set of input/output devices 84 over a system bus 86. The CPU 82, input/output devices 84 and system bus 86 are consistent with prior art systems. However, the computer 80 also includes a memory 88 which stores a novel set of programs used to implement the present invention. The memory 88 stores an operating system 90 and GUI code 92. In the disclosed embodiment of the invention, the GUI code 92 includes a Java® Virtual Machine of the type specified by Sun Microsystems®, Inc., Mountain View, Calif., the assignee of the present invention. The GUI code 92 also includes an Abstract Window Toolkit (AWT) 96, as specified by Sun Microsystems®, Inc., Mountain View, Calif. As known in the art, the AWT 96 provides a class for implementing a GUI 92. In particular, the AWT 96 provides classes for creating graphical user interface elements. By using these elements, the look and feel of a Java® Applet® can be controlled. Classes provided in the AWT 96 include methods for constructing windows, buttons, menus, fonts, images, scrollbars, etc. By way of example, FIG. 4 illustrates a drawRect method 98 and setForeground method 100 associated with the AWT 96. Many other additional methods are provided in a typical embodiment.

The GUI code 92 also includes event queue code 27, which is used to construct a set of event queues 72A–72N. The event queue code 27 may be consistent with prior art implementations. The present invention is directed toward supplementing the operation of the event queue code 27 or substituting the event queue code 27 with pluggable event queue code 70.

FIG. 4 also illustrates that the memory 88 includes a properties file 104. The properties file 104 is a text file. As discussed below, the pluggable event queue code of the invention maybe invoked by simply forming a text entry in the properties file 104.

FIG. 4 also illustrates that the memory 88 includes pluggable event queue code 70. The pluggable event queue code 70 is used to generate event queues 72A–72N. As illustrated below, the pluggable event queue code 70, also referred to as customized event queue modules, can be used to generate customized queues that maybe used for debugging, tracing, event recording, or any other operation.

Finally, the memory 88 of FIG. 4 includes a set of application programs 30A–30N. The application programs 30 receive messages from the event queues 72A–72N. They subsequently process those messages in a standard manner.

Attention presently turns to example embodiments of the invention so that the invention can be more fully appreciated. The following examples are in the context of the Java® computer language.

The event queues of the invention are created by event queue code which is loaded at the time of system initialization. For example, an event queue module class is loaded during system initialization. This operation has been performed using the following code:

(1) public SunToolkito( ) {
(2) theEventQueue=new EventQueueo( );}

The instructions of lines (1) and (2) are used to load the "EventQueue" class from the standard AWT 96 library. In other words, the event queue code 27 to create the event queues 72A–72N is available in a standard AWT library 96. The instructions of lines (1) and (2) operate to initialize this class, so that the event queues can be created. This operation is consistent with prior art techniques for generating event queues.

The present invention creates customized event queues (or pluggable event queues) by loading a pluggable event queue module (pluggable event queue code) 70 as a subclass of the event queue class. This operation may be facilitated by reading from a properties file 104 a text message identifying the customized event queue module. This implementation of the invention is advantageous because the properties file, such as the "AWT.properties" file of the commercially available AWT code 96 from Sun Microsystemsg, Inc., can be modified by an external developer. Thus, by specifying a new class in the properties file 104, the new class is initialized at system start-up and is subsequently invoked.

The following code has been used to perform this operation:

```
(3)  public SunToolkit() {
(4)        String egName =
           Toolkit.getProperty("AWT.EventQueueClass",
                              "java.awt.EventQueue");
(5)        try {
(6)             theEventQueue =
                (EventQueue)Class.forName(egName).newInstance();
(7)        } catch (Exception e) {
(8)             System.err.println("Failed loading " +
                egName + ":" + e);
(9)             theEventQueue = new EventQueue();
           }
}
```

Line (4) of the code is an example of fetching a text message from a properties file. In particular, a "String" identified as "eqName" is fetched from an AWT.properties file. If a customized event queue module 70 has been created for the system, then a text message is made in the properties file 104, which is read by the code of line (4). For example, one text message may be "AWT.EventQueueClass= TracedEventQueue" or it may be "AWT.EventQueueClass= MyEventQueue", these example are discussed below.

The code in lines (5) and (6) is used to attempt to load the customized event queue module code identified in the properties file. Lines (7)–(9) are used for exception handling. Note at line (8) that an error message will print showing the failed loading and particularly specifying the module "eqName" that could not be loaded. Line (9) is the same as line (2) above; it is used to initialize the event queue class in the case that the pluggable event queue module cannot be loaded.

The foregoing example code has been used to demonstrate the loading of an event queue module 27. The code has also demonstrated the loading of a customized event queue module (or pluggable event queue code) 70. Attention presently turns to different examples of actual customized event queue module code 70 that may be used to perform different reporting operations in accordance with the invention.

A "TracedEventQueue" properties file 104 entry was described above. The customized event queue code 106 corresponding to this entry may be as follows:

```
(10)    public class TracedEventQueue extends EventQueue {
(11)        public void postEvent (AWTEvent theEvent) {
(12)            System.out.println (theEvent);
(13)            super.postEvent(theEvent);
        }
    }
```

Lines (10)–(13) describe a sample sub-class customized event queue module 70 used to trace events before they are posted (sent) to an event queue 72. The term "extends" at line (10) indicates that the "TracedEventQueue" is a sub-class of the event queue code "EventQueue". Line (11) specifies a type of event ("AWTEvent") and an instance of the event ("theEvent"). Line (12) causes the printing of the "theEvent" to the GUI 62. The foregoing code will effectively create a customized event queue 72 listing a set of messages resulting from an operation performed with the GUI 62. For example, the event queue 72 may list a set of resize instructions, paint instructions, focus instructions, mouse activation instructions etc.

Line (13) of the code invokes the event queue code 27 so that the event queue code can operate in a standard manner. This operation corresponds to the operation shown in FIG. 3 where the pluggable event queue code 70 calls event queue code 27. Note then that in this embodiment of the invention, the pluggable event queue code 70 intercepts the run-time messages sent to the event queue for processing which results in the run-time messages being displayed. This reporting operation is useful for debugging purposes.

A "MyEventQueue" properties file 104 entry was also described above. The pluggable event queue code 70 corresponding to this entry may be as follows:

```
(15)    public class MyEventQueue extends EventQueue {
(16)        protected void dispatchEvent(AWTEvent event) {
(17)            boolean tracing = false;
(18)            int id = event.getID();
(19)            if(id == KeyEvent.KEY_PRESSED || id ==
                    KeyEvent.KEY_RELEASED) {
(20)                KeyEvent e = (KeyEvent)event;
(21)                if(e.getKeyCode() == KeyEvent.VK_P &&
                        (e.getModifiers() &
                        InputEvent.CTRL_MASK)>0) {
(22)                    System.out.println("\n\nTracing " + event);
(23)                    Runtime.getRuntime().traceMethodCalls(true);
(24)                    tracing = true;
                }
```

-continued

```
            }
(25)        super.dispatchEvent (event);
(26)        if (tracing) {
(27)            System.out.println("End tracing " + event + "\n");
(28)            Runtime.getRuntime().traceMethodCalls(false);
(29)            tracing = false;
            }
        }
}
```

Lines (15)–(29) describe a sample sub-class customized event queue module 70 used to trace events in response to a Ctrl-P keyboard combination. As in the case of line (10) above, line (15) "extends" the class "EventQueue" to include a sub-class, the sub-class in this example is "MyEventQueue".

Lines (17) and (18) are used for initialization operations. The code in line (19) is used to identify the pressing down and releasing of a keyboard key and recording it as an event. Line (20) casts the event as a new type. Line (21) checks whether the new event is a Ctrl-P key sequence. If so, the lines (22)–(24) are executed. Line (22) causes the tracing of events to be printed. Line (23) is used to turn on a switch ("traceMethodCalls") in the Java® Virtual Machine which causes events to be traced. Line (24) sets the variable "tracing" to true. Line (25) invokes the event queue code 27. Thus, after line (25) is executed, standard event queue code 27 operations are performed.

Line (26) tests whether a tracing operation occurred. If so, a message is printed at line (27). Line (28) is used to turn of the switch ("traceMethodCalls") in the Java® Virtual Machine. Finally, line (29) sets the tracing variable back to a false boolean value.

The "TracedEventQueue" and "MyEventQueue" customized event queue module 70 examples demonstrate the operation of the invention. Naturally, any number of customized event queue modules may be constructed in accordance with the invention so that a variety of debugging, tracing, and event recording operations can be performed. It is important to observe that the customized event queue modules can operate without altering the operation of the event queue. In the foregoing examples, pluggable event queue code 70 was executed, then standard event queue code 27 was called from the pluggable event queue code 70. In view of this feature, the invention can be operated as a pluggable add-on to existing event queue environments. Observe also that the pluggable event queue code 70 need not call the event queue code 27. Instead, the pluggable event queue code 70 may itself be written to handle all event queue operations. In this case, the original event queue code 27 is not modified, it is simply not called, rather it is preempted by the pluggable event queue code 70.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

What is claimed is:

1. A method of monitoring event queue operations, said method comprising the steps of:

producing an event queue with a standard event queue module class that is loaded during system initialization;

reading from a properties file a text message identifying a customized event queue module specified as a non-standard customized class;

loading said customized event queue module as a sub-class of said event queue module class;

responding to a set of run-time messages resulting from an operation performed with a graphical user interface;

routing said set of messages to said customized event queue module for processing; and passing said set of messages to an application program for processing;

wherein said customized event queue module produces debugging g, tracing, and event recording information without altering the operation of said event queue.

2. A computer readable memory to direct a computer to function in a specified manner, comprising:

a first set of instructions to produce a standard event queue with an event queue module class that is loaded during system initialization;

a second set of instructions to read from a properties file a text message identifying a customized event queue module specified as a non-standard customized class;

a third set of instructions to load said customized event queue module as a sub-class of said event queue module class;

a fourth set of instructions to route a set of messages from a graphical user interface to a customized event queue module for processing; and a fifth set of instructions to pass said set of messages to an application program for processing;

wherein said customized event queue module produces debugging, tracing, and event recording information without altering the operation of said event queue.

3. A method of transferring data over a network, said method comprising the steps of transmitting from a first computer on said network to a second computer on said network a set of electronic signals defining one or more modules to monitor event queue operations performed on said second computer, said one or more modules including:

a first set of instructions to produce said event queue with a standard event queue module class that is loaded during system initialization;

a second set of instructions to read from a properties file a text message identifying said customized event queue module specified as a non-standard customized class;

a third set of instructions to load said customized event queue module during system initialization;

a fourth set of instructions to route a set of messages from a graphical user interface to a customized event queue module for processing; and a fifth set of instructions to pass said set of messages to an application program for processing;

wherein said customized event queue module produces debugging, tracing, and event recording information without altering the operation of said event queue.

* * * * *

UNITED STATES PATENT AND TRADEMARK OFFICE
CERTIFICATE OF CORRECTION

PATENT NO. : 6,189,047 B1
DATED : February 13, 2001
INVENTOR(S) : Thomas A. Ball It is certified that error appears in the above-identified patent and that said Letters Patent is hereby corrected as shown below:

<u>Column 7,</u>
Line 20, delete "mes sages" and insert -- messages --; and
Line 25, delete "debugging g," and insert -- debugging, --.

Signed and Sealed this

Sixteenth Day of October, 2001

*Attest:*

*Attesting Officer*

NICHOLAS P. GODICI
*Acting Director of the United States Patent and Trademark Office*